(12) United States Patent
Huettner

(10) Patent No.: US 8,815,356 B2
(45) Date of Patent: *Aug. 26, 2014

(54) MACHINE-READABLE PLASTIC PREFORM

(75) Inventor: Gerald Huettner, Vilseck (DE)

(73) Assignee: Krones AG (DE)

( * ) Notice: Subject to any disclaimer, the term of this patent is extended or adjusted under 35 U.S.C. 154(b) by 129 days.

This patent is subject to a terminal disclaimer.

(21) Appl. No.: 13/269,396

(22) Filed: Oct. 7, 2011

(65) Prior Publication Data

US 2012/0088060 A1   Apr. 12, 2012

(30) Foreign Application Priority Data

Oct. 7, 2010 (DE) .......................... 10 2010 047 616

(51) Int. Cl.
| | | |
|---|---|---|
| *B32B 1/00* | (2006.01) | |
| *B32B 1/02* | (2006.01) | |
| *B29C 45/37* | (2006.01) | |
| *B29B 11/14* | (2006.01) | |
| *B29K 105/00* | (2006.01) | |
| *B29C 49/06* | (2006.01) | |
| *B29B 11/08* | (2006.01) | |

(52) U.S. Cl.
CPC ....... *B29B 11/14* (2013.01); *B29B 2911/14026* (2013.01); *B29K 2105/258* (2013.01); *B29B 2911/1402* (2013.01); *B29B 2911/14106* (2013.01); *B29B 2911/1444* (2013.01); *B29B 2911/14133* (2013.01); *B29C 45/372* (2013.01); *B29B 2911/14333* (2013.01); *B29C 49/06* (2013.01); *B29B 2911/14506* (2013.01); *B29B 2911/14326* (2013.01); *B29B 2911/14033* (2013.01); *B29B 2911/14466* (2013.01); *B29B 11/08* (2013.01); *B29B 2911/1404* (2013.01)
USPC .... 428/35.7; 428/36.6; 428/36.92; 428/542.8

(58) Field of Classification Search
USPC .......... 428/34.1, 34.4, 34.6, 34.7, 35.7–35.9, 428/36.4–36.7, 36.9–36.92, 542.8
See application file for complete search history.

(56) References Cited

U.S. PATENT DOCUMENTS

| | | | |
|---|---|---|---|
| 5,567,377 A | * | 10/1996 | Nishigami et al. ............ 264/515 |
| 6,769,895 B2 | | 8/2004 | Derouault et al. ............ 425/145 |
| 2003/0020193 A1 | | 1/2003 | Hamamoto et al. ......... 264/40.1 |

FOREIGN PATENT DOCUMENTS

| | | | |
|---|---|---|---|
| EP | 0835736 | 4/1998 | .............. B29C 45/04 |
| EP | 1279477 | 1/2003 | .............. B29C 49/00 |
| JP | 2007175994 | 7/2007 | .............. B29B 11/12 |

OTHER PUBLICATIONS

German Search Report issued in related application No. 10 2010 047 616.1, dated Feb. 3, 2012 (5 pgs).
English translation of priority document DE102010047619.6, yet to be published (14 pgs).

* cited by examiner

*Primary Examiner* — Walter B Aughenbaugh
(74) *Attorney, Agent, or Firm* — Hayes Soloway P.C.

(57) ABSTRACT

A plastic preform has a base body, and a threaded area disposed on and integrally formed with the base body. An integrally formed annular section extends outwards in a radial direction from the base body, below the threaded area. The annular section has a first surface facing the base body and a second surface facing the threaded area. A marking characteristic of at least one property of the plastic preform is located on a surface section of the plastic preform below the threaded area, in the longitudinal direction of the plastic perform, extending at an angle of non-zero in relation to the longitudinal direction of the plastic preform.

9 Claims, 2 Drawing Sheets

MACHINE-READABLE PLASTIC PREFORM

BACKGROUND OF THE INVENTION

The present invention relates to a plastic preform. Such plastic preforms have been known from the prior art for a long time and are used for example to be moulded, in the context of a blow moulding process, in particular of a stretch blow moulding process, into plastic containers (e.g. drink bottles).

Such blow moulding machines, for example stretch blow moulding machines, usually operate with different parameters such as for example blow moulding parameters. These parameters depend on the plastic container to be moulded. Many beverage fillers and converters use various plastic preforms for manufacturing the same container. However, this is linked with parameter adjustments within the blow moulding and heating process. Depending on the circumstances, plastic preforms that are not part of that particular process may still be present in the system. This, in turn, can lead to faults in the line, in particular if a wrong plastic preform is not detected and consequently not removed from a blow moulding machine.

The present invention is therefore based on the object of providing a plastic preform that allows a better and, if required, automated adjustment of a blow moulding machine and in particular of a stretch blow moulding machine to be achieved.

According to the invention, this is achieved by means of a plastic preform according to claim 1. Such preforms can be produced if an injection mould according to claim 14 is used. Advantageous embodiments and developments are the subject matter of the dependent claims.

SUMMARY OF THE INVENTION

A plastic container according to the invention and in particular a plastic preform includes a base body as well as a threaded area provided on the base body, said threaded area being integrally formed with the base body. Further, the base body includes a dome area terminating the same.

According to the invention, the plastic preform has a marking that is characteristic of at least one property of the plastic preform.

Preferably, the plastic container includes a section that is annular at least in sections, which section is located below the threaded area and extends outwards particularly preferably in a radial direction of the plastic container and which is particularly preferably also integrally formed with the base body. Here, the annular section advantageously includes a first surface facing the base body and a second surface facing the threaded area. A surface facing the base body or the threaded area is here in particular to be understood to mean that a direction that is perpendicular to this surface extends in the direction of the base body or of the threaded area.

The markings may be located at any desired position on the external surface as well as on the internal surface of the plastic preform, in particular between the thread leads, between the thread and the support ring, but a marking may also be placed on the inside of the plastic preform or on the non-stretchable section of the base body of the plastic preform. Also, a marking can be made on the base body over the entire circumference, both on the stretchable and the non-stretchable areas thereof.

Advantageously, this marking is located on a surface section of the plastic preform, which extends in a longitudinal direction of the plastic preform below the threaded area, said surface section advantageously extending at an angle of non-zero in relation to the longitudinal direction of the plastic preform. Preferably, the surface section extends at an angle of at least 20°, preferably of at least 40°, preferably of at least 50° and particularly preferably of at least 60° in relation to the longitudinal direction. It is pointed out that the present invention can also be applied to other plastic containers such as in particular plastic bottles.

According to the invention, it is therefore proposed to provide the plastic preform with a marking that provides information about a property of the plastic preform. For example, a corresponding marking or coding of the plastic preform may include a date of production or data characteristic thereof and can therefore give information about the age of the plastic preform, and a machine can automatically adjust the heating and blow moulding temperature. Preferably, such marking identification means may be positioned upstream of the entrance into the oven, so that the machine can respond in good time.

Such a suitable position for an identification means would for example be on a supply rail, so that it can be ensured that the plastic preform can be removed even prior to the heating process. If the removal is carried out properly, also gaps in the heating device can be avoided so that the system can be designed to be even more efficient.

As mentioned, the plastic container is preferably a plastic preform. However, it would also be possible for a completed plastic container or a canister or the like to have such a marking. Also, plastic preforms without an annular body fall under this term.

By the advantageous placement of the marking on a section that deviates from the longitudinal direction of the container, and thus not exactly on the base body section that extends in the longitudinal direction, it is achieved that the marking can be identified by monitoring along the longitudinal direction of the plastic preform independently of the respective rotary position of the plastic preform.

Preferably here, said surface section is part of the first surface, of the dome area or of the second surface. In this way, a detection of said marking is made possible in a particularly simple manner.

In a further advantageous embodiment, the marking can be monitored by means of a monitoring device that monitors the plastic preform in the longitudinal direction thereof. Such a monitoring device was described in the patent application titled "Kunststoffvorformlinge mit Markierung zur Lageerkennung" (DE 10 2010 047 619.6) (plastic preforms having a marking for position identification), which was filed by the applicant at the same time as the present application. The disclosure of this application is included in its entirety in the disclosure of the present application by reference.

In a further advantageous embodiment, the marking is a recess or an elevation formed in a surface section. In principle, it would also be possible to attach the marking retroactively for example by means of a printer or laser. Advantageously, however, the marking is produced in a mechanical manner and particularly preferably as early as during the injection moulding process. In particular, the marking is a recess introduced into said section.

Advantageously, said recess (if disposed on the first surface of the support ring) does not extend as far as the second surface. Thus, the marking is positioned here only on the bottom side of the annular section or support ring. However, the marking is still optically well accessible in this way and a detection of the marking is in particular not hampered by gripping elements or by the thread of the plastic preform. As a result of the fact that the marking advantageously does not extend through the annular body or the support ring, the support ring has an undisturbed sealing face on a second surface thereof, which is of advantage particularly for the subsequent blow moulding process.

Advantageously, the annular section is unpolished at least in sections and is advantageously completely unpolished. Plastic preforms are usually polished on the surface thereof and also on the surface of said support ring. In the present embodiment, however, it is advantageous to leave said surface deliberately unpolished. In this way it is possible that the transparency from the base body of the plastic preform down to a background is reduced, so that improved visibility at critical locations of the system, such as for example the edges on a gripping clamp, is ensured. Conversely, however, it would also be possible for the support ring to be polished and the notch or marking to be matted.

Advantageously, the lateral surfaces of the marking deviate considerably both from the horizontal as well as from the vertical. They are for example V-shaped. As a result, the lateral surfaces of the marking can on the one hand be seen large in the preferably almost vertical monitoring direction, and on the other hand, contrary to the horizontal support ring surface, they no longer fulfill the reflection condition between the illumination direction and the monitoring direction. As a result, the markings appear dark on the reflecting support ring. In order to enhance this effect, the marking can advantageously be polished. In this way, a good detection of the marking with optical image capturing devices becomes possible.

As mentioned, the support ring bottom side of the plastic preform is advantageously matted, which means there is a slight fine-grained deviation of the surface from the horizontal. The benefits that result from this are that such a surface mitigates the harsh reflection conditions between an illumination direction and a monitoring direction. As a result, the reflection becomes more coarse-grained but at the same time uniformly bright. In this case, there will be a particularly good contrast against the marking or notch.

Further, vision through the support ring of the plastic preform becomes foggy, as a result of which the effect of any disturbances behind the support ring, which may be the result of the holding grippers and the thread and the environment, is reduced. In this way, it will become easier to evaluate the image.

Apart from that, said rough surface also reduces manufacturing costs. The injection moulding tool used to produce the plastic preform is for example rough, wherein the first processing steps are carried out using rougher tools. In order to generate a high-gloss surface, expensive and time-consuming polishing methods are necessary. The need for such methods in the area of the support ring of the plastic preform may be eliminated, and this is exactly what makes the plastic preform easier to inspect.

However, it would also be possible to provide several markings or codings on the plastic preform. Apart from a marking on the bottom side of the support ring, such markings can also be provided on other surfaces such as for example below the mouth. Such a coding may for example be formed by one or several lines such as notches or by the geometric design of such a notch. Apart from that, instead of radial notches, also other structures such as for example with oblique lateral flanks may be provided, such as for example pyramid-shaped or cone-shaped indentations. Such a coding may also be used for an orientation of the plastic preform.

In this way, a "machine-readable" plastic preform can be provided. The treatment machine can here associate the plastic preform on the basis of this code (that is in particular provided on the support ring) and can, if required, respond to the plastic preform. As a result, the machine can initiate suitable measures such as for example the removal of the plastic preform, an adjustment of processing parameters and an orientation of the plastic preform and the like.

In a further advantageous embodiment, the annular body completely surrounds the plastic preform and is formed without any continuous recesses in the longitudinal direction of the plastic preform. In this way, as mentioned above, blow-mouldability in a subsequent moulding process is facilitated.

An annular body or section is understood to mean an area which for example completely surrounds a geometrical longitudinal axis. In this connection, this annular section may be designed to be circular, however, it would also be possible for the section to be for example oval and/or polygonal. Preferably, the annular section has a constant width in the radial direction, however, it would also be possible for the radial width of the annular section to vary in the circumferential direction of the plastic preform.

Advantageously, the annular section is a completely formed annular body, which is advantageously formed to be consistent all round. Apart from that, however, it would also be possible for the annular body to extend at a slight angle in relation to the radial direction. Advantageously, however, the annular body extends essentially exactly in said radial direction.

In a further advantageous embodiment, the plastic container is an injection moulding (i.e. an injection moulded piece). It is possible here for said marking to be integrated into the plastic preform as early as during the injection moulding process.

In a further advantageous embodiment, the annular section extends beyond the threaded area in the radial direction of the plastic container. In this way, sealing by means of a blow moulding nozzle during a moulding process is facilitated.

In a further advantageous embodiment, said marking is disposed only on the first surface, but if required it may also be detectable from the top.

In a further advantageous embodiment, the plastic container is at least partially transparent. The expression "at least partially" is here to be understood to mean that on the one hand individual geometrical areas of the plastic preform may be formed to be transparent, however, it would also be possible for the expression "partially transparent" to mean a certain transparency, for example a 60 or 50% transparency or a transparent colour.

If intensely scattering particles are contained in the material of the plastic preform, which make the plastic preform opaque or diffuse, the diffuse scattering prevails. Structures such as non-continuous notches, which utilise the reflection properties, are then no longer very easily visible. Since diffuse scattering is usually very bright, the contrast from the background disturbances becomes greater. This diffuse scattering will then impart a very uniform appearance to the plastic preform. In this case, a continuous (extending through the support ring) marking or notch is preferably used. Preferably, however, such a continuous notch or recess is provided only on the radially outer edge of the plastic preform and therefore does in particular not go as far as the base body of the plastic preform. In this way, sufficient room remains on the support ring for the sealing thereof within the blow moulding machine or during the blow moulding process.

To enable the machine to detect which plastic preform is located in the machine, as mentioned, a marking in the form of a code is provided on the plastic preform. This code can take the form of one or several lines (e.g. notches) or of the geometric design of a notch or a line. Also, the marking or the code may be used for orientating the plastic preform (in relation to the longitudinal axis thereof). Thus, for example, it would be possible to optically detect any markings or codes such as for example 2-D codes, barcodes or RFID codes, so that a conclusion with regard to the rotary position of the plastic preform can be made.

Markings in terms of the present application are any type of coding. Preferably, 2-D codes, barcodes or contactless coding, in particularly RFID, may be provided. In the case of the latter, RFID should be provided during an injection moulding method in corresponding forms, so that this can be injected into the preform. Advantageously, the marking is an optically readable marking.

By means of the machine-readable plastic preform, the machine can identify the plastic preform and can, if necessary, respond to it. Possible measures would for example be guiding the plastic preform out, a parameter adjustment, an orientation and the like.

In a further advantageous embodiment, the characteristic property is selected from a group of properties consisting of geometrical data of the plastic preform, such as for example the length, height, thread diameter, thread pitch and the like thereof, the weight of the plastic preform, a material of the plastic preform (such as for example a resin type), a colour of the plastic preform, a manufacturing date of the plastic preform, a manufacturer of the plastic preform, a raw material of the plastic preform, machine-related release information (the information whether the plastic preform has been released for a certain machine, for example when the parent company of the filling company demands a certain type), combinations thereof or the like.

Advantageously, the marking is positioned in an area of the plastic preform that is to be stretched or in one that is not to be stretched. The advantage of a positioning in an area that is to be stretched is that the marking will disappear after the production of the plastic preform (as a result of the stretching process). The advantage of a positioning of the marking in an area that is not to be stretched is that the marking will permanently remain on a plastic preform, which results in the advantage that also the plastic bottle that will subsequently be produced from the preform will remain identifiable by this marking.

In a further advantageous embodiment, at least part of the marking is suitable or used for determining a rotary position of the plastic preform in relation to the longitudinal axis thereof. If a corresponding detection system is positioned between a blowing wheel and a pitch reduction starwheel, then also the position of the injection point on the heated plastic preform in relation to the support ring can be determined.

The present invention further relates to an injection mould for producing a plastic preform of the type described above. This injection mould has here three mould parts, which form a receiving cavity for receiving a material to be moulded, as well as a thread production section for producing a threaded area of the plastic preform and a mould body disposed between at least two mould parts for producing the cavity of the plastic preform. In this connection, the material to be moulded can be introduced between the mould parts and the mould body in order to form a wall of the plastic preform.

According to the invention, a stamp element is provided in at least one mould part and/or in the thread production section, which stamp element is suitable for producing the above-mentioned marking or which stamp element embosses said marking into an external surface of the plastic preform. Preferably, one of the mould parts is used for producing the dome area of the plastic preform and particularly preferably the stamp element is provided in this area.

Particularly preferably, this stamp element is removably provided in said mould part. Thus, a code can be generated for example in a bottom piece of the injection mould by using adjustable character stamps. This can for example represent a date or a lot, and these character stamps are easily replaceable and modifiable.

Since said marking stamp can be replaced, barcodes or a matrix can also be realised at low costs, because no new cavity is required for this purpose.

These machine-readable preforms can also be used in multi-product lines, so that due to the marking (in the case of markings that are not stretched) for example the corresponding product is filled in.

Further advantageous embodiments will become evident from the dependent claims.

BRIEF DESCRIPTION OF THE DRAWINGS

Further advantages and embodiments will become evident from the attached drawings, wherein.

DETAILED DESCRIPTION OF THE INVENTION

Figure 1:
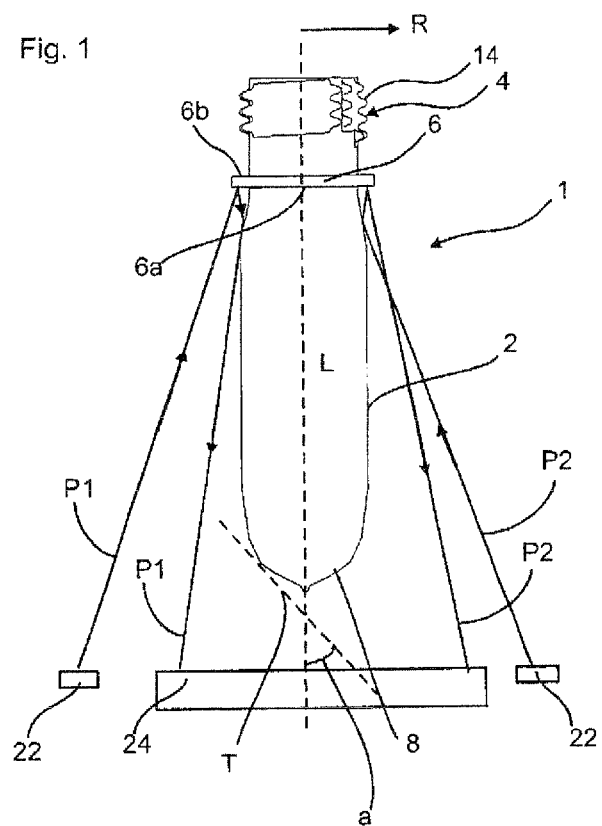
FIG. 1 shows a lateral view of a plastic preform according to the invention.

FIG. 1 shows a lateral view of a plastic preform 1 according to the invention. This plastic preform has a base body 2, said base body being expandable in the course of an expansion process and has here a threaded area 4 that is integrally formed with the base body 2. The threaded area 4 is not stretched in the course of the expansion process. Reference numeral 14 relates to a thread lead of the thread of the plastic preform. Further, the plastic preform includes an annular body, which means a support ring 6, which in turn has a surface 6b that faces upwards, i.e. towards the threaded area 4, and a surface 6a facing downwards, i.e. towards the base body 2.

In plastic preforms made from a clear, at least partially transparent material, the majority of the light used for inspection goes through the transparent support ring 6. This proportion causes disturbances in the space, on the thread or on the holding device, which are easily visible through a polished support ring. In order to reduce these disturbances, the background and the holding device should ideally have a matted, very absorbent and abrasion resistant surface. Holding devices which completely surround the circumference are ideal because they form a uniform background for the support ring, however, they are realisable only to a limited extent.

In the case of preforms made from a transparent material, the image-determining proportion of the light is the reflection light. During inspection, therefore, it has to be ensured that the reflection condition between the illumination direction and the monitoring direction is met.

If, however, as proposed in one embodiment, the support ring 6 is designed to be not completely transparent, but is unpolished, light may be more uniformly reflected on the surface 6a. The arrow chains P1 and P2 illustrate possible beam paths during the inspection of the container or the bottom side 6a of the support ring. Here, illumination devices 22, such as for example LEDs annularly disposed about the longitudinal direction L of the plastic preform, direct light onto the plastic preform and the reflected light is received by a camera device 24, and in this way a (spatially resolved) image of the bottom side of the plastic preform 1 or of the support ring is captured.

As a result, the actual image is respectively generated by a double reflection on the support ring 6 and on the base body 2 of the plastic preform 1. Since the surfaces (of the base body 2) are quite bright, only a small angular range is generated, in which the reflection conditions are met. This is the starting point for the reception of the marking. Preferably, therefore, the base body 2 of the plastic preform is polished.

In the case of the beam path P1, the light first reaches the bottom side of the support ring and is directed from there via the base body 2 to the image capturing device 24 (which may be designed, for example, as a camera). In the case of the beam path P2, the light is first reflected from the base body 2 and then reaches the image capturing device 24 via the bottom side 6b of the support ring. Thus, the plastic preform described here is suitable in particular for a pericentric (i.e. the entire circumference) monitoring along the longitudinal direction L thereof.

Reference numeral 8 relates to a dome area of the plastic preform. This dome area therefore delimits at the same time the plastic preform towards the bottom. In a corresponding manner, the optics shown can also capture an image of the dome area 8 of the plastic preform and can in this way detect the marking and/or determine a rotary position of the plastic preform.

Reference character "a" refers to an angle under which a surface section A of the plastic preform, on which a marking may be present, extends in relation to the longitudinal direction L of the plastic preform. Here, for simplification, an angle between a tangent T adjoining this surface section and the longitudinal direction L is indicated. In fact, said surface section is here curved, however, any tangents adjoining this surface section, which are in the figure plane of FIG. 1, would include an angle of non-zero with the longitudinal direction L.

Figure 2:
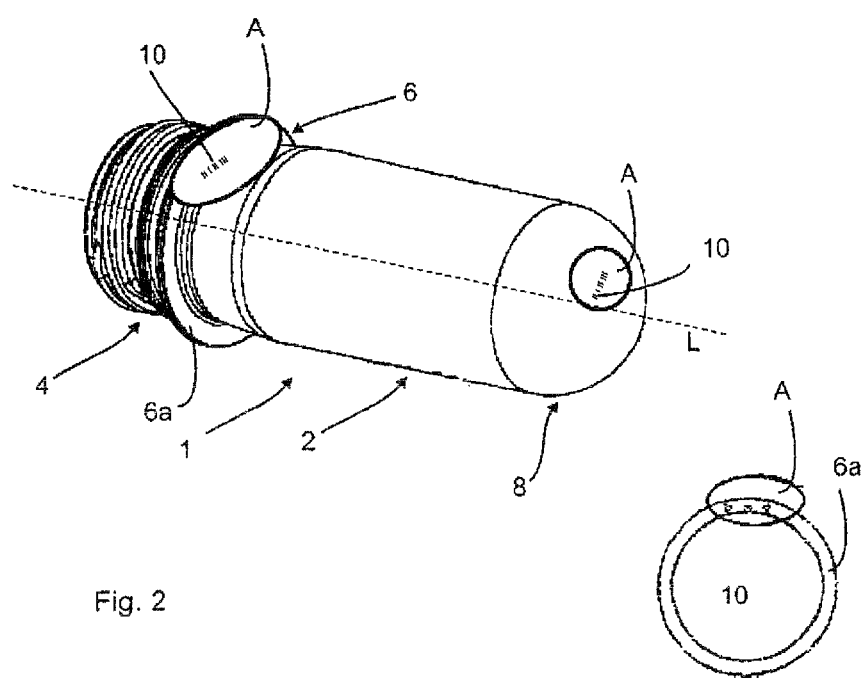
FIG. 2 shows a perspective view of a plastic preform according to the invention.

FIG. 2 shows a perspective view of a plastic preform 1 according to the invention. Here, too, markings 10 can be seen on the bottom side 6a of the support ring 6. These markings 10 can be detected by means of optical inspection devices. It would also be possible here, as mentioned above, to provide a plurality of markings, so that a conclusion with regard to the properties of the plastic preform can be made from these markings. However, it would also be possible to provide for example a barcode or similar on the bottom side of the surface 6a of the thread 6. Conversely, it would also be possible here to provide such coding 10 also in order to enable the machine to determine which plastic preform is present in the machine, and here the marking 10 can also be used to determine the orientation of the plastic preform in relation to the longitudinal axis L thereof. The bottom sub-image of FIG. 2 shows the support ring 6.

Reference character A respectively relates to possible locations on which the markings 10 may be provided. The marking 10 can here, as shown, be located either on a bottom side of the support ring 6 of the plastic preform 10 or in the dome area. If the marking is located in the dome area 8, it is in principle possible for this marking to be present anywhere in the area of this dome, in particular in areas that are outside of the injection point. Moreover, also other areas may be conceivable for providing the marking, such as for example between the thread leads, on the mouth area surfaces or on any other surface of the preform.

Figure 3:
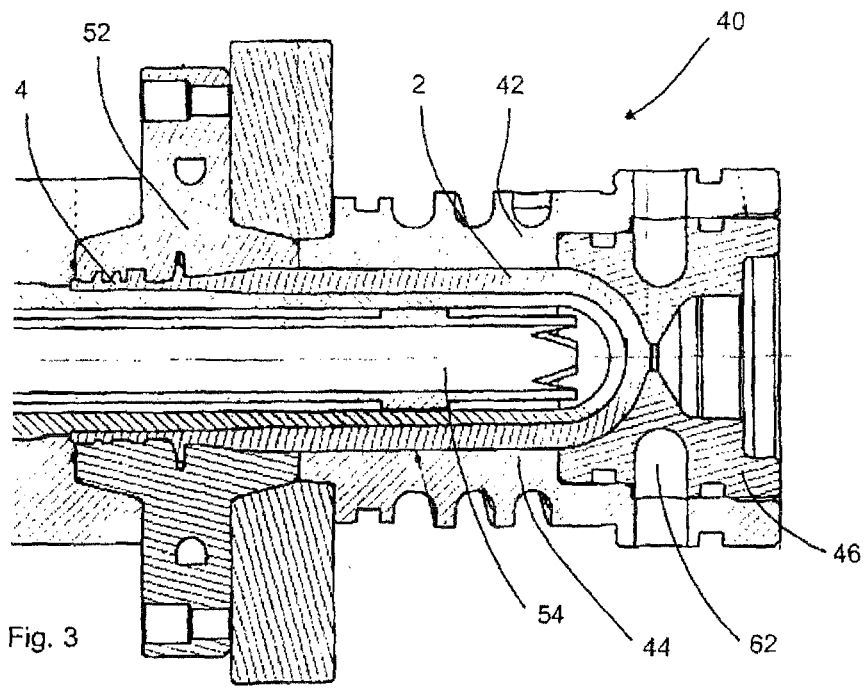
FIG. 3 shows a schematic view of an injection moulding tool.

FIG. 3 shows an injection mould for producing a plastic preform according to the invention. Reference numeral 42 relates here to a first mould part and reference numeral 44 to a second mould part. Reference numeral 46 identifies a bottom part which forms a receiving chamber for forming the plastic preform together with mould parts 42 and 44. The plastic preform is here again identified with reference numeral 10.

Moreover, the injection mould includes a thread production section 52 in order to produce the threaded area 4 of the plastic preform 10.

Reference numeral 62 relates to a groove for cooling the bottom part 46 and reference numeral 54 relates to a mould body or core which, during the production of the plastic preform, is located between mould parts 42 and 44, in order to form the plastic preform 10 in the space lying therebetween.

Figure 4:
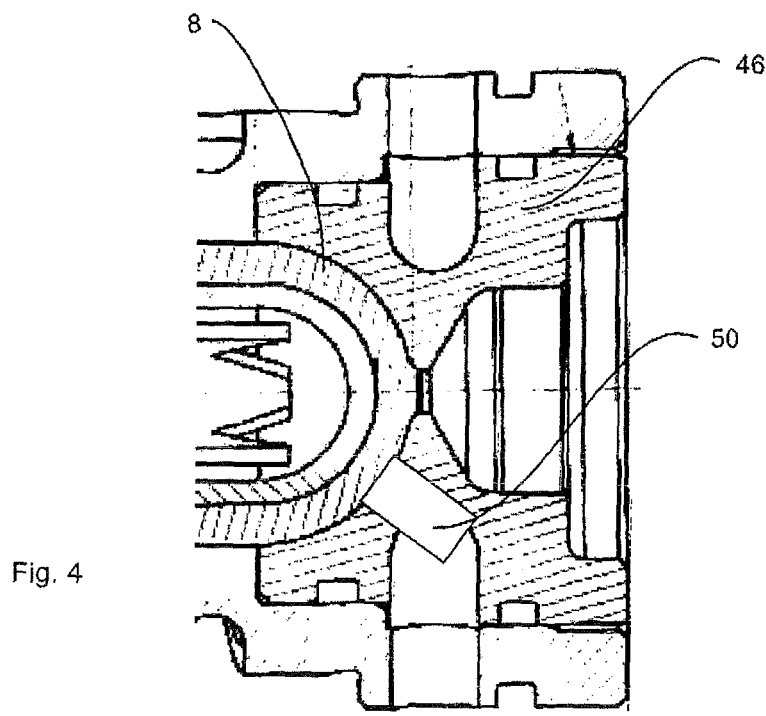
FIG. 4 shows a detailed view of the injection moulding tool from FIG. 3.

FIG. 4 shows a detailed view of the injection moulding tool shown in FIG. 3. What can additionally be seen here is a stamp element 50 that can be used to apply the marking shown in FIG. 2 during the injection moulding process. Here, this stamp element 50 is removably provided on the bottom portion 46 and can, if required, be replaced with other stamp elements. A corresponding stamp element could also be provided in the thread production section in order to provide a marking in the support ring 6. Here, both polished and unpolished markings can be generated using the different stamps. Moreover, it would also be conceivable for the stamp element to be disposed on the mould body or the core 54 in order to attach in this way markings on the internal surface of the plastic preform. Further, it would also be possible to provide several stamp elements in order to provide several markings on the plastic preform.

The applicant reserves the right to claim all of the features disclosed in the application documents as being essential to the invention in as far as they are novel over the prior art either individually or in combination.

LIST OF REFERENCE NUMERALS

1 Plastic preform
2 Base body
4 Threaded area
6 Support ring, thread
6a Surface
6b Surface, bottom side
8 Dome area
10 Marking, coding
14 Thread lead
22 Illumination devices
24 Camera device, image capturing devi
40 Injection mould
42 First mould part
44 Second mould part
46 Bottom portion
50 Stamp element
52 Thread production section
54 Mould body, core
62 Groove
A Possible locations for markings
L Longitudinal direction
P1 Arrow chains
P2 Arrow chains, beam path
a Angle
T Tangent

The invention claimed is:

1. A plastic preform, comprising a base body, a threaded area disposed on the base body, said threaded area being integrally formed with the base body, said base body having a dome area terminating said base body, wherein the plastic preform includes a marking that is characteristic of at least one property of the plastic preform, wherein the plastic preform includes at least an annular section, said annular section being disposed below the threaded area and extending outwards in a radial direction of the plastic preform and being intergrally formed with the base body, said annular section including a first surface facing the base body and a second surface facing the threaded area, wherein said marking is positioned on a surface section of the first surface of the plastic preform, wherein the surface section is disposed spaced longitudinally below the threaded area in a longitudinal direction of the plastic preform, wherein said surface section extends at an angle of non-zero in relation to the longitudinal direction of the plastic preform, and wherein the surface section is part of the first surface or of the second surface.

2. The plastic preform as claimed in claim 1,
wherein the marking can be monitored with a monitoring device that monitors the plastic preform in the longitudinal direction thereof.

3. The plastic preform as claimed in claim 1,
wherein the marking is a recess or an elevation formed in the surface section (A).

4. The plastic preform as claimed in claim 1,
wherein the annular section is unpolished at least in sections.

5. The plastic preform as claimed in claim 1,
wherein the marking is polished.

6. The plastic preform as claimed in claim 1,
wherein the plastic preform is an injection moulding.

7. The plastic preform as claimed in claim 1,
wherein the characteristic property is selected from a geometric data of the plastic preform, a weight of the plastic preform, a material of the plastic preform, a colour of the plastic preform, a manufacturing date of the plastic preform, a manufacturer of the plastic preform, a raw material of the plastic preform, machine-related release information, and a combination thereof.

8. The plastic preform as claimed in claim 1,
wherein the marking is provided in an area of the plastic preform that is to be stretched or in one that is not to be stretched.

9. The plastic preform as claimed in claim 1,
wherein at least part of the marking is used to determine a rotary position of the plastic preform in relation to the longitudinal axis thereof.

* * * * *